Feb. 20, 1962  K. F. MILLER  3,021,748
METHOD FOR BONDING SUPPORT RODS IN PROPELLANT GRAINS
Filed May 19, 1958  2 Sheets-Sheet 1

INVENTOR.
K.F. MILLER
BY *Hudson and Young*
ATTORNEYS

Feb. 20, 1962 K. F. MILLER 3,021,748
METHOD FOR BONDING SUPPORT RODS IN PROPELLANT GRAINS
Filed May 19, 1958 2 Sheets-Sheet 2

INVENTOR.
K. F. MILLER
BY Hudson and Young
ATTORNEYS

United States Patent Office 3,021,748
Patented Feb. 20, 1962

3,021,748
METHOD FOR BONDING SUPPORT RODS IN PROPELLANT GRAINS
Kenneth F. Miller, McGregor, Tex., assignor to Phillips Petroleum Company, a corporation of Delaware
Filed May 19, 1958, Ser. No. 736,392
4 Claims. (Cl. 86—1)

This invention relates to a rocket motor loaded with solid propellant grains which are bonded to support rods positioned in said motor. In one aspect this invention relates to a means for bonding massive solid propellant grains to the support rods therefor. In another aspect this invention relates to an improved method for bonding massive propellant grains to a support rod.

Booster rocket motors, employing solid propellant grains as the combined fuel and oxidizer, present scale-up problems of fabrication and assembly which are not found in the prior art because the prior art deals mainly with small, light-weight propellant grains. These large-scale booster rocket motors utilize multi-grain propellant charges made up from an enormous mass of solid propellant (e.g. 3 tons or more) designed to impart a high effective thrust (e.g., 130,000 to 250,000 pounds or more) and high total impulse (e.g. of 1,000,000 lb.-seconds).

Booster type rocket motors utilizing multi-grain solid propellant charges are disclosed and claimed in copending application Serial No. 717,259, filed February 25, 1958, by W. G. Haymes et al. Because such booster rocket motors must reach great velocities in extremely short periods (e.g., two to six seconds), with a subsequent sudden increase in inertial load upon the propellant charge, it is essential that the grains of the propellant charge be securely bonded to the support rods which traverse these grains so as to retain the propellant grains securely in fixed position during operation. This invention provides an improved method and means for bonding the individual grains of the propellant charge through the support rods.

It is therefore an object of this invention to provide an improved method for applying the bonding material to the annulus between the grain perforation and the support rod. It is also an object of this invention to provide an improved means for injecting the bonding material into the annulus between the perforation of the propellant grain and the support rod. It is a further object of this invention to provide a method and means for the simultaneous injection of bonding material into the annuli of all of the propellant grains. It is still another object of this invention to provide a method and means for applying the bonding material after all of the grains of the propellant charge are positioned in a bundle for insertion into the rocket motor case. Other and further objects and advantages of this invention will be apparent to one skilled in the art upon study of this disclosure and the appended drawing wherein:

Figure 1:
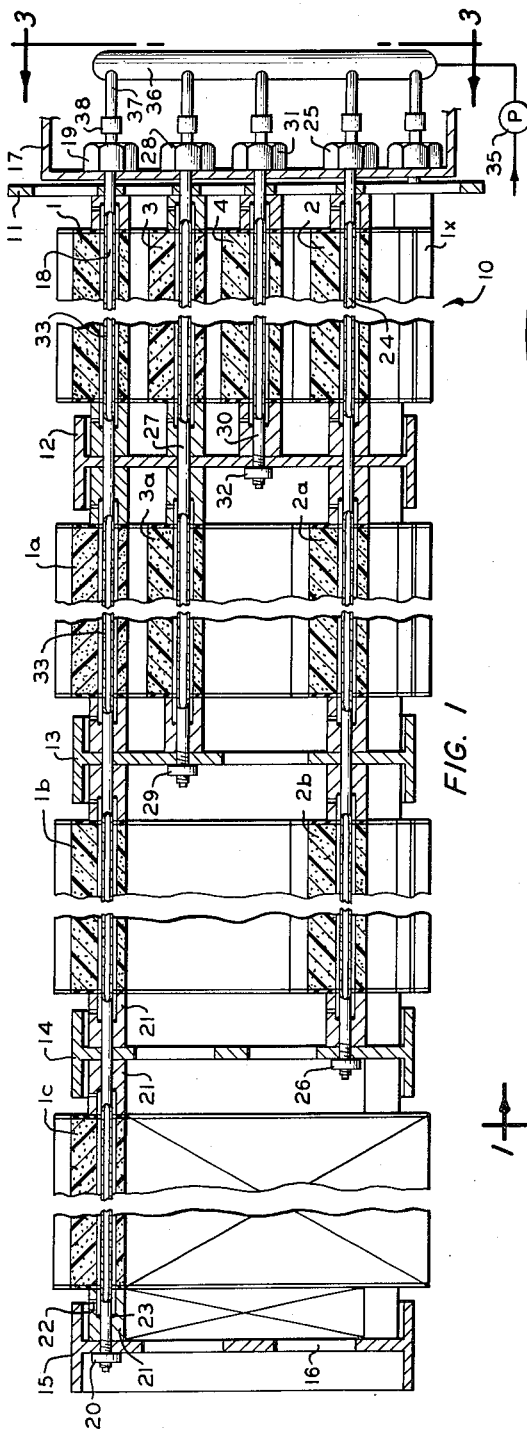
FIGURE 1 illustrates a simplified cross section along lines 1—1 of FIGURE 2 of a booster rocket motor charge containing the grains of the propellant charge assembled into a bundle.
Figure 3:
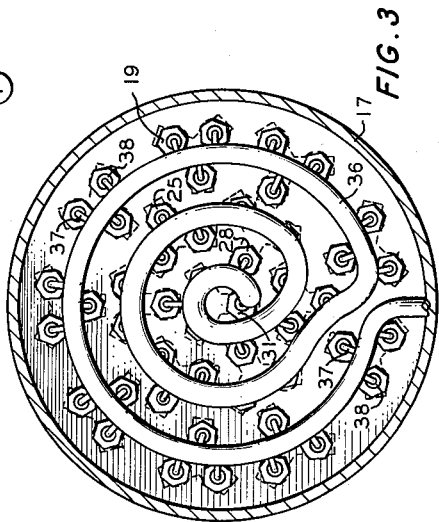
FIGURE 3 is a view along lines 3—3 of FIGURE 1.
Figure 5:
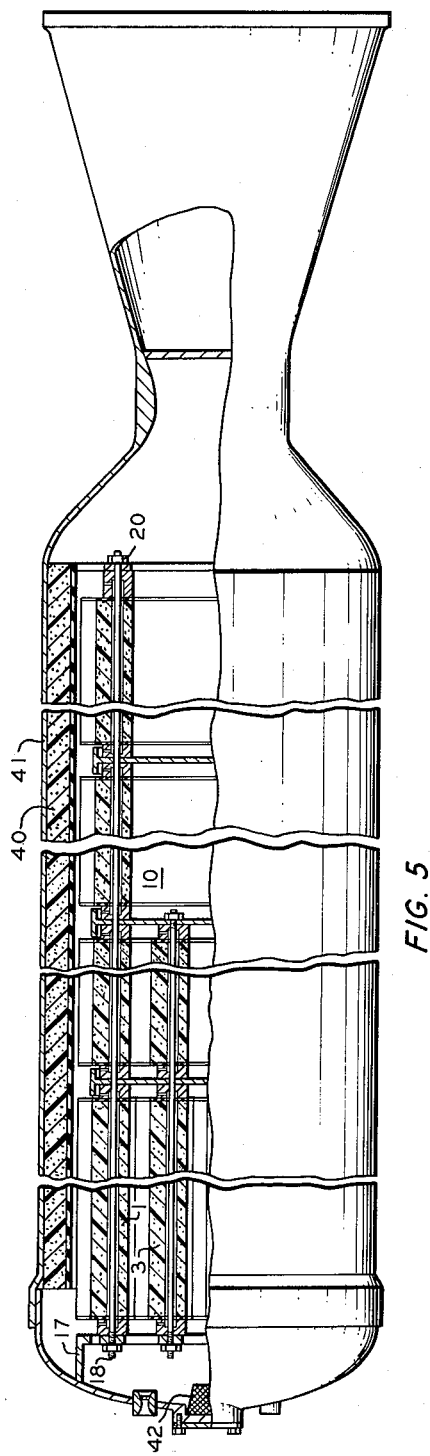
FIGURE 5 is a view, partly in section, of a rocket motor.

Referring now to the drawing and particularly to FIGURE 1, there is shown a schematic cross sectional view of a multi-grain propellant charge assembled into a bundle 10 for bonding of the propellant grains to the supports prior to insertion of the bundle in the rocket motor case as shown in FIGURE 5. The bundle 10 is composed of banks A, B, C, and D wherein grains 1, 2, 3, and 4 make up bank A; grains 1a, 2a and 3a make up bank B; grains 1b and 2b make up bank C; and grains 1c make up bank D.

Figure 2:
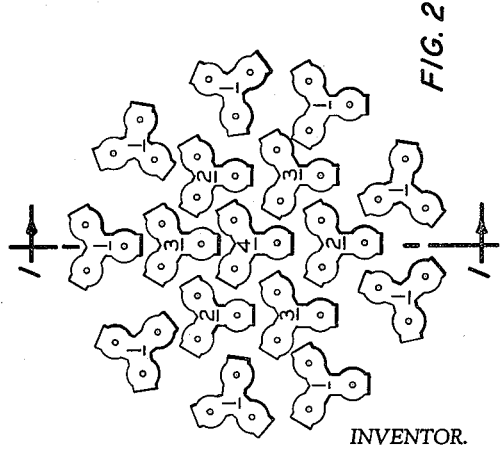
FIGURE 2 is a diagrammatic end view of the propellant grains as assembled in the bundle for insertion into the motor case.

The arrangement of grains 1, 2, 3, and 4 is shown in FIGURE 2, and FIGURE 1 is a cross sectional view of FIGURE 2 is simplified form to facilitate description of the invention. The position of grain 1, as repeated at the bottom of FIGURE 1, is indicated as 1x.

Support plates 11, 12, 13, 14 and 15 can be made of light weight metal and can be fabricated by stamping so as to provide ports or openings 16 for the passage of combustion gases. The bundle 10 is secured to the head plate of the motor case by means of bulkhead 17 which, in turn, is secured to the headplate. Support tube 18 passes through bulkhead 17, all of the banks of grain 1 and the support plates and secures the banks together by means of nut 19 and nut 20. A plurality of identical spacers 21 separate the propellant grains from the support plates. The spacers can be made of polyethylene, resin impregnated glass fibers, aluminum or other light weight, rigid material. Each spacer 21 has an opening, or a vent, 22 which permits escape of air but prevents escape of bonding agent. Each spacer 21 is sealed at the junction with tube 18 by a rubber O-ring 23.

Support tube 24 passes through bulkhead 17, banks A, B, and C of grain 2 and is secured to bulkhead 17 and support plate 14 by nuts 25 and 26 on the threaded ends of tube 24. Support tube 27 passes through bulkhead 17, support plates 11, 12, and 13 and is secured to bulkhead 17 by nut 28 and is secured to support plate 13 by nut 29. Support tube 30 passes through bulkhead 17 and support plates 11 and 12 and is secured to bulkhead 17 by nut 31 and to plate 12 by nut 32. Each of the support tubes has a plurality of openings through the wall thereof indicated at 33 to allow passage of bonding material from the interior of the support tube into the annulus between the support tube and the perforation of the propellant grain.

Figure 4:
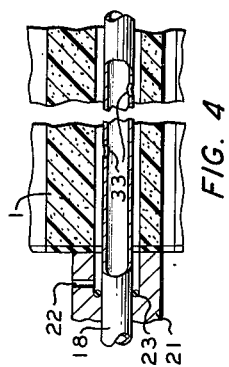
FIGURE 4 is a detailed view of a support rod positioned in the perforation of a propellant grain.

FIGURE 4 is a detailed sectional view showing the relationship of the propellant grain, the support rod and the spacer and is shown as applied to grain number 1 and support rod 18. The bonding agent is introduced into the interior of the support tube as a viscous liquid from whence it passes through the passageways 33 into the annulus between the support tube and propellant grain causing air to be expelled through vent 22 of spacer 21 until the annulus is substantially filled at which time the back pressure of the liquid attempting to pass through vent 22 causes the liquid to flow to the next bank.

The liquid bonding agent is injected into the support tubes from a source (not shown) through pump 35 and manifold 36 through flexible tubings 37 which are attached to the support tubes by coupling 38. Couplings 38 can be such as are used in pressure grease equipment, e.g., "Alemite" lock-on couplings. The support tubes can be equipped with ball-type check valves at the point where the coupling 38 attaches to maintain the liquid under pressure until it sets up as a solid bonding agent.

FIGURE 5 is a partial sectional view of a rocket motor having the bundle 10 comprising the propellant charge positioned in the rocket motor case. An annular layer of propellant 40 is bonded to the motor case 41 prior to positioning the bundle 10 in the rocket motor. The igniter 42 and other components of the rocket motor are conventional and require no further description here.

Prior to my invention solid support rods have been used and it has been necessary, in the case of multiple bank motors, to pump the bonding cement into the space between the propellant and the rod. This method was both time consuming and expensive and, furthermore, badly needed facilities were thus tied up for an extended period of time during assembly and bonding of the propellant grains. According to the method of my invention a heavy-walled tube is substituted for the solid support rods formerly used and the tube is perforated at points which coincide with the perforation of propellant grains through which the support tube is passed. All of the banks which go to make up the bundle comprising the propellant charge for the motor are assembled and the support tubes made fast before the bonding operation. Each slab, or grain, is fitted with a spacer around the rod on both ends of the slab and this spacer has a vent hole to permit escape of air. The bonding cement is then pumped into the tube through an adapter on one end by means of a hand or motor driven pump. When the bonding cement is observed extruding from the ends of all slabs, the bonding is complete. The back pressure in the slabs will cause even distribution of the cement.

Use of the method and means of this invention will reduce the time required for bonding the propellant slabs to the support tubes to about 25 percent of the time formerly required, will effect considerable savings in the amount of adhesive or bonding agent used because of the short pot life of the bonding agent, and will also effect a great savings in the man hours because the bonding operation is not only accomplished in reduced time but the bonding and assembling of the grains into the bundle is accomplished simultaneously.

The propellant grain and the bonding material can be cured in the bundle after assembly of the bundle or the bundle can be positioned in the rocket motor case and the curing effected in the motor case.

Any of the known solid propellant compositions which are utilized as booster charges for rockets can be utilized in this invention. Solid propellants contain a combination of oxidizer and fuel mixed together and formed into grains. The grains are usually formed by an extrusion process although some grains are formed by compression molding. Examples of solid propellant compositions include mixtures of nitrocellulose, nitroglycerin and binder materials, mixtures of gunpowder and carbon, mixtures of potassium chlorate and asphalt, mixtures of ammonium picrate and sodium nitrate, and other combinations of oxidizers and fuels.

A preferred solid propellant for booster charges comprises grains of a mixture of ammonium nitrate, a rubbery organic polymeric compound such as butadiene-methylvinylpyridine copolymer, curing agents and a burning rate catalyst. The organic polymeric compound acts as the fuel and as the binder for binding the ingredients into a solid grain. These propellants are produced by mixing the oxidizer and copolymer together with suitable vulcanizing or quaternizing agents and, if desired, a suitable burning rate catalyst. The resulting mixture is then molded or extruded and cured to form the propellant grain. These propellants and methods for their production are more fully described in copending application, Serial No. 284,447, filed April 25, 1952, by W. B. Reynolds and J. E. Pritchard.

A particularly preferred propellant composition is prepared by combining from about 50 to 90 parts by weight of ammonium nitrate, as the solid oxidizer, with about 10 to 50 parts by weight of binder and burning rate catalyst. The burning rate catalyst will usually comprise 0 to 10 parts by weight per 100 parts of the entire composition. The preferred binder will comprise about 25 to 98 parts by weight of 1,3-butadiene and about 2 to 75 parts by weight of 2-methyl-5-vinylpyridine. Burning rate catalysts include rouge, prussian blue, milori blue, and the like.

A wide choice of materials is possible for the restrictor-bonding agents which can be utilized in the practice of this invention. Included are GRS-plasticizer-tackifier formulations, butadiene-methylvinylpyridine-plasticizer-tackifier formulations, natural rubber-solvent formulations, and various synthetic rubber-solvent formulations available as commercial rubber type bonding agents.

Any rubber plasticizer can be utilized, such as dibutoxyethoxyethyl formal, benzophenone, monoamylbiphenyl, and the like.

Suitable tackifiers include the various resins of a class generally called alkyd resins. These include polymers of rosin acids of modified rosin acids esterified with polyalkoxy compounds such as pentaerythritol, diethylene glycol, triethylene glycol, polyethylene glycol, glycerine, and the like. Esters of di- and tri-carboxylic acids with the above hydroxy compounds are also applicable. Examples of the latter acids are phthalic acid and malic acid. An especially good tricarboxylic acid for tackifier preparation is made by reacting rosin acid (abietic acid) with malic anhydride. In the class of resins which can be used as tackifier-hardeners are mellamine-formaldehyde and urea-formaldehyde resins modified by the addition of alcohols such as octyl alcohol.

These formulations are capable of being softened to the desired degree by the use of solvents such as benzene, toluene, xylene and other aromatic hydrocarbons and are made to cure under conditions compatible with the curing of rocket propellant grains by the addition of accelerators such as Butyl-eight (a dithiocarbamate type rubber accelerator sold by R. D. Vanderbilt Company) and SA-113 (N,N,N'-dimethyl-tertiary-butyl-phenyl dithiocarbamate).

Other bonding agents include a mixture of epoxy resin and 2,4,6-tri (dimethylaminomethyl) phenyl; and polyurethane. Polyurethane compositions are well known; however, two preferred formulations are shown in the following table:

| Ingredients | Parts by Weight | |
| --- | --- | --- |
| | Composition No. 1 | Composition No. 2 |
| Castor Oil | 57.14 | 56.31 |
| Neopentyl Glycol | 10.86 | |
| Toluene Diisocyanate | 32.00 | 32.43 |
| Hexylene Glycol | | 11.26 |

Commercial diisocyanate is generally employed and it is usually an 80/20 mixture of the 2,4/2,6 isomers.

The ingredients of the polyurethane formulation are mixed together just prior to use.

Variations and modifications are possible within the scope of this disclosure without departing from the spirit and scope of the invention.

That which is claimed is:

1. A process for simultaneously bonding a plurality of perforated, external burning rocket grains to support rods positioned in the perforations thereof so as to withstand the forces of acceleration which comprises forming each support rod with an axial opening therethrough and a plurality of radial openings therethrough in communication with said axial opening; assembling the plurality of grains into a unitary bundle with the support rods passing through the perforations of the grains, through a plurality of support plates and through a plurality of spacer means; securing the support rods in position so as to form an annulus between each rod and grain; filling the axial openings and radial openings of the rods and the annulus with a fluid bonding agent; and curing said bonding agent.

2. In the process for producing booster rocket motor charges wherein a plurality of perforated, external burning, solid rocket propellant grains are bonded to support rods and assembled into a bundle by means of a plurality of support plates through which the support rods pass with spacer means separating the grains from the support plates and from each other, the improvement which comprises assembling the grains into a unitary bundle with a perforated tube serving as the support rod and passing through the perforation of each grain and support plate to form said bundle so that there is provided an annulus between each tube and grain; and simultaneously supplying bonding agent to each tube so as to fill each tube and the annulus between the tube and grain whereby all of the grains are bonded to the tubes in one operation.

3. A multi-grain solid propellant charge assembly for a rocket motor which comprises a plurality of perforated, solid propellant grains; a plurality of support plates; a plurality of perforated spacer plates to separate said grains from each other and from the support plates; a plurality of radially perforated support tubes each open at one end and positioned so as to pass through said grains, said support plates and said spacers to secure the grains together with an annulus between each grain and a support tube; bonding agent occupying said annuli; and means to secure at least one support plate to a rocket motor case.

4. In a rocket motor comprising a combustion chamber, a reaction nozzle and a propellant charge comprising a plurality of perforated solid propellant grains supported within said combustion chamber, the combination therewith of a plurality of perforated support plates at least one of which is secured to said combustion chamber; a plurality of perforated spacer means positioned to separate the grains from the support plates and from each other; a plurality of radially perforated support tubes each having a diameter less than that of the perforation of said solid propellant grains, positioned in the perforation of at least one grain, one support plate, one spacer means and secured to said combustion chamber; and a bonding agent substantially filling each tube and space between the wall of the tube and the wall of the grain perforation.

References Cited in the file of this patent
UNITED STATES PATENTS

| | | |
|---|---|---|
| 2,423,700 | Hardy | July 8, 1947 |
| 2,446,560 | Skinner | Aug. 10, 1948 |
| 2,495,640 | Muskat | Jan. 24, 1950 |
| 2,605,607 | Hickman | Aug. 5, 1952 |
| 2,877,504 | Fox | Mar. 17, 1959 |
| 2,942,645 | Edwards | June 28, 1960 |